US012789995B2

(12) United States Patent
Azeredo et al.

(10) Patent No.: US 12,789,995 B2
(45) Date of Patent: Nov. 10, 2026

(54) CARGO HOOK IMPLEMENTING AN AUTOMATIC LOCKING KEEPER CONFIGURED TO INCREASE SAFETY, REDUCE A LIKELIHOOD OF DYNAMIC ROLLOUT, AND/OR THE LIKE

(71) Applicant: BREEZE-EASTERN LLC, Whippany, NJ (US)

(72) Inventors: Ian Azeredo, Whippany, NJ (US); Brianna Kaminski, Whippany, NJ (US); John Luczkovich, Whippany, NJ (US)

(73) Assignee: BREEZE-EASTERN LLC, Whippany, NJ (US)

(*) Notice: Subject to any disclaimer, the term of this patent is extended or adjusted under 35 U.S.C. 154(b) by 860 days.

(21) Appl. No.: 18/130,689

(22) Filed: Apr. 4, 2023

(65) Prior Publication Data

US 2023/0312094 A1 Oct. 5, 2023

Related U.S. Application Data

(60) Provisional application No. 63/327,420, filed on Apr. 5, 2022.

(51) Int. Cl.

*B66C 1/34* (2006.01)
*B64D 1/22* (2006.01)
*B66C 1/36* (2006.01)
*B64C 27/10* (2023.01)

(52) U.S. Cl.

CPC .................. *B64D 1/22* (2013.01); *B66C 1/34* (2013.01); *B66C 1/36* (2013.01); *B64C 27/10* (2013.01)

(58) Field of Classification Search

CPC .. B66C 1/34; B66C 1/36; B64C 27/04; B64C 27/10; B64D 1/22
USPC ..................................... 294/82.33; 244/137.4
See application file for complete search history.

(56) References Cited

U.S. PATENT DOCUMENTS

| | | | | |
|---|---|---|---|---|
| 2009/0072562 A1* | 3/2009 | Brunner | B66C 1/36 | 294/82.2 |
| 2010/0001139 A1* | 1/2010 | Humbert | B66C 1/34 | 244/137.4 |
| 2021/0047148 A1* | 2/2021 | Autissier | B66C 1/36 | |

FOREIGN PATENT DOCUMENTS

| | | | |
|---|---|---|---|
| GB | 1463078 A * | 2/1977 | B66C 1/34 |

OTHER PUBLICATIONS

Cargo Hooks (FE7590) https://www.breeze-eastern.com/fe7590/ (Year: 2026).*
Onboard Systems—Complete Cargo Hook Kits https://www.youtube.com/watch?v=934opsyNse0&t=66s (Year: 2009).*
New Aeroquip Helicopter Cargo Release Hook FE7590-145 8000LB found at: https://www.ebay.com/itm/274673731261 (Year: 2026).*
(Continued)

*Primary Examiner* — Mahdi H Nejad
(74) *Attorney, Agent, or Firm* — Baker Hostetler

(57) ABSTRACT

A cargo hook includes a main body; a load arm configured to be pivotally attached to the main body with a load arm pivot connection; a keeper configured to be pivotally attached to the main body through a keeper pivot connection; and a keeper control unit configured to have a keeper locked configuration that locks movement of the keeper about the keeper pivot connection with respect to the main body.

20 Claims, 10 Drawing Sheets

(56) References Cited

OTHER PUBLICATIONS

Aviation occurrence briefs—Inadvertent load release involving an Airbus Helicopters AS350 B3, near Wentworth Falls, NSW, on Feb. 20, 2020; www.atsb.gov.au/publications/occurrence-briefs/2020/aviation/ab-2020-023/; Feb. 2020; accessed Feb. 23, 2022; 4 pages.
Onboard Systems Black Hawk replacement cargo hook kitcertifi ed by FAA; https://www.avfoil.com/gadgets-tech/onboard-systems-black-hawk-replacement-cargo-hook-kit-certified-by-faa/; AV Foil; Sep. 2020; accessed Feb. 23, 2022; 3 pages.

* cited by examiner

CARGO HOOK IMPLEMENTING AN AUTOMATIC LOCKING KEEPER CONFIGURED TO INCREASE SAFETY, REDUCE A LIKELIHOOD OF DYNAMIC ROLLOUT, AND/OR THE LIKE

CROSS-REFERENCE TO RELATED APPLICATIONS

This application claims the benefit from U.S. Provisional Application No. 63/327,420 filed on Apr. 5, 2022, which is hereby incorporated by reference in its entirety for all purposes as if fully set forth herein.

FIELD OF THE DISCLOSURE

The disclosure relates to a cargo hook implementing an automatic locking keeper configured to increase safety, reduce a likelihood of dynamic rollout, and/or the like. The disclosure additionally relates to a process of implementing a cargo hook utilizing an automatic locking keeper configured to increase safety, reduce a likelihood of dynamic rollout, and/or the like.

BACKGROUND

Helicopter external cargo management equipment typically includes a device called a cargo hook used for attaching and removing coupled external loads to the helicopter for direct or indirect attachment to load such as a person, animal, and/or one or more objects (load) for rescue, transport, lift, and/or the like.

Typical implementations of the cargo hook include a keeper that typically keeps a sling from separating from the cargo hook. Typically, the keeper pivots and is typically spring-loaded closed. Accordingly, there is a risk of an event called "dynamic rollout." More specifically, the environment in which the helicopter or other aircraft operates as well as the load holding device and the load that is being lifted is highly dynamic and includes or is subjected to various forces, accelerations, movements, and/or the like. In this regard, this highly dynamic environment may result in inadvertent release of the load from the cargo hook. In particular, the inadvertent release may be the result of dynamic rollout.

Dynamic rollout, also known as ring rollout and/or D-ring reversal, is a phenomenon that can be described as the unintended release of the primary engaging ring from a winch or cargo hook that may occur after a momentary unloading situation or unloading event. An unloading situation or unloading event permits a dynamic condition allowing the ring to travel up and flip over the beak or tip of the hook and come to rest on the spring-loaded keeper. The ring is now only supported by the spring-loaded keeper. When the load is re-applied, the spring-loaded keeper allows the ring to fall free from the hook, thereby inadvertently releasing the load.

Accordingly, a device, system, and/or process to increase safety and/or limit dynamic rollout is needed to ensure safe operation of the aircraft and a safety of the load.

SUMMARY OF THE DISCLOSURE

The foregoing needs are met, to a great extent, by the disclosure, wherein in one aspect a cargo hook and process for automatically locking keeper are provided.

One aspect includes a cargo hook that includes a main body; a load arm configured to be pivotally attached to the main body with a load arm pivot connection; a keeper configured to be pivotally attached to the main body through a keeper pivot connection; and a keeper control unit configured to have a keeper locked configuration that locks movement of the keeper about the keeper pivot connection with respect to the main body.

One aspect includes a process of implementing a cargo hook that includes providing a main body; providing a load arm configured to be pivotally attached to the main body with a load arm pivot connection; providing a keeper configured to be pivotally attached to the main body through a keeper pivot connection; and providing a keeper control unit configured to have a keeper locked configuration that locks movement of the keeper about the keeper pivot connection with respect to the main body.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

Reference herein to an "aspect," "example," or similar formulations means that a particular feature, structure, operation or characteristic described in connection with the "aspect" or "example," is included in at least one implementation in this description. Thus, the appearance of such phrases or formulations is this application may not necessarily all refer to the same example. Further, various particular features, structures, operations, or characteristics may be combined in any suitable manner in or more examples.

DETAILED DESCRIPTION

Figure 1:
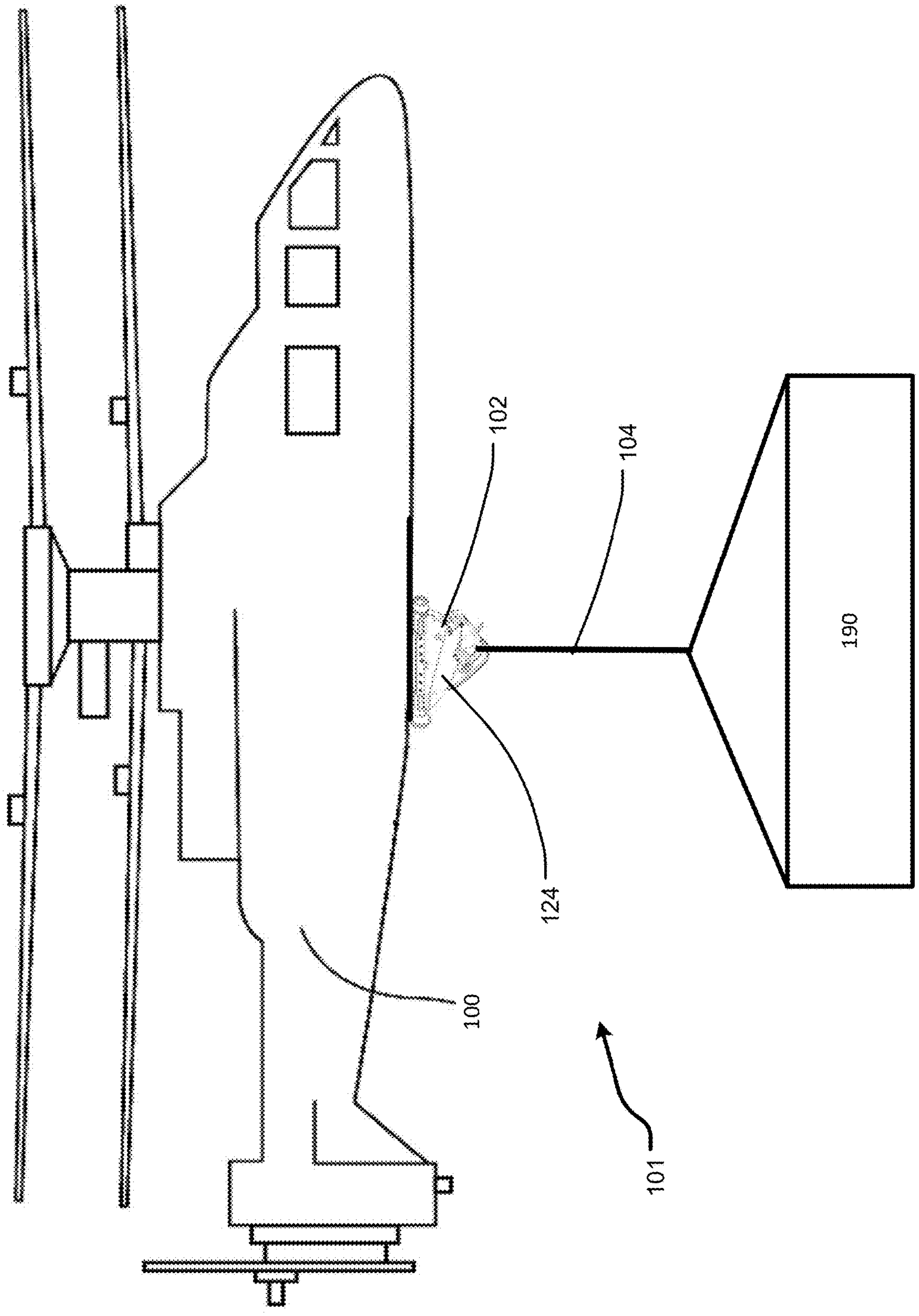
FIG. 1 illustrates a helicopter with an exemplary helicopter external cargo management system implementing a cargo hook utilizing an automatic locking keeper configured to increase safety, reduce a likelihood of dynamic rollout, and/or the like in accordance with aspects of the disclosure.

The disclosure will now be described with reference to the drawing Figures, in which like reference numerals refer to like parts throughout. Aspects of the disclosure advantageously provide a cargo hook system and cargo hook process for implementing an automatic locking keeper.

Figure 9:
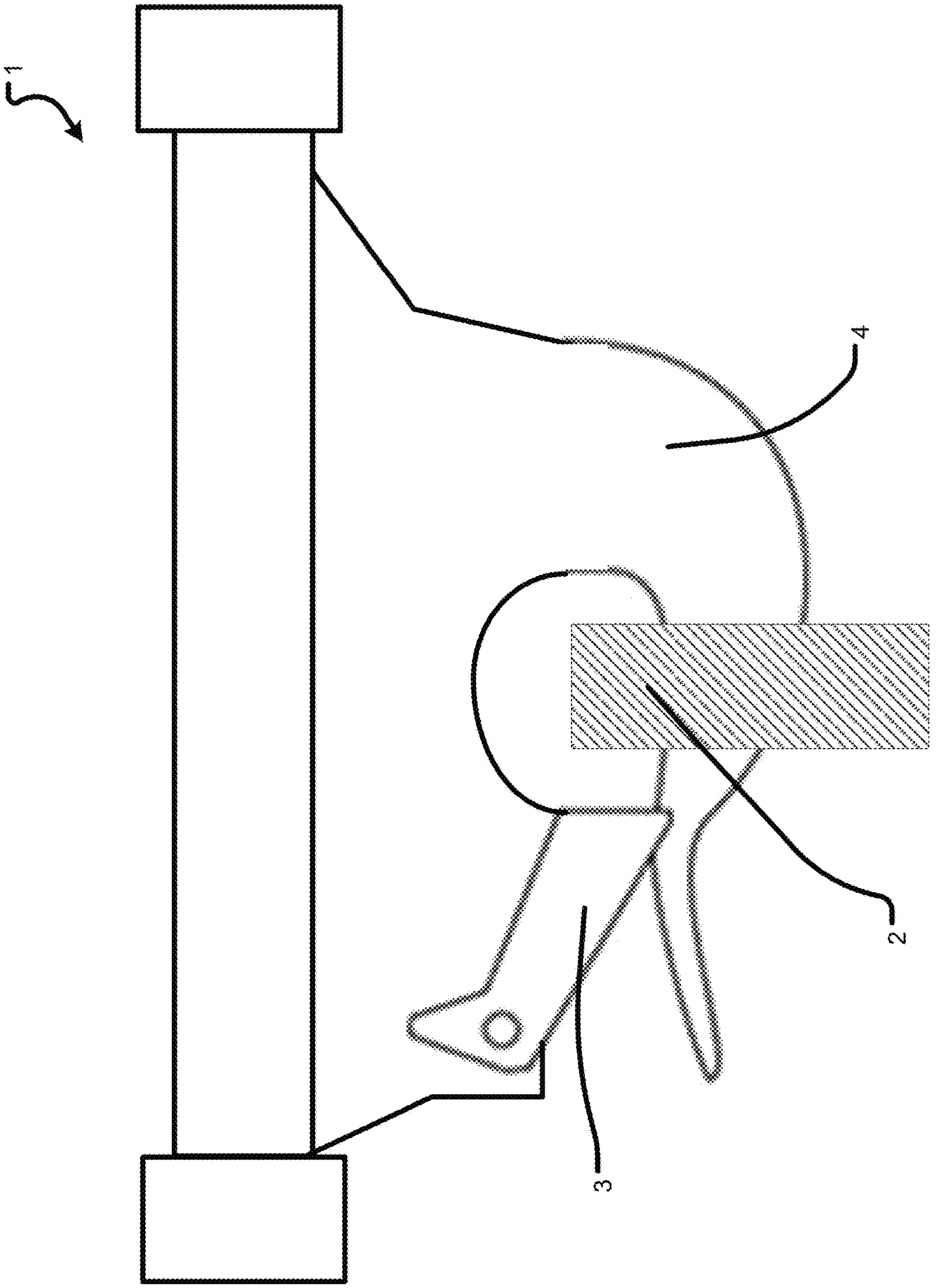
FIG. 9 PRIOR ART
FIG. 9 illustrates an implementation of a cargo hook.

FIG. 9 illustrates an implementation of a cargo hook. In particular, FIG. 9 illustrates an implementation of a cargo hook 1 that is a device that can accept an eyelet of a sling 2, a tether, a load ring, a strap, and/or the like (hereinafter sling 2). The cargo hook 1 may include a keeper 3 or latch. In this regard, the keeper 3 of the cargo hook 1 is like a gateway limiting movement of the sling 2 with respect to the cargo hook 1. Typically, the keeper 3 is spring-loaded closed as illustrated in FIG. 9. The typical cargo hook 1 may be configured to have the ability to have an operator feed the sling 2 onto the cargo hook 1 by rotating the keeper 3 with respect to a load arm 4 and the sling 2 stays in place with the keeper 3. In particular, the keeper 3 rotates snapping shut or closed, as illustrated in FIG. 9, after the sling 2 is installed and/or located within the cargo hook 1. In this regard, the sling 2 is illustrated as being arranged on the load arm 4 of the cargo hook 1 with the keeper 3 closed limiting movement of the sling 2.

Additionally, in some implementations of the cargo hook 1, the cargo hook 1 may be configured with one or components to electrically, pneumatically, hydraulically, and/or the like open the cargo hook 1 so that the load arm 4 of the cargo hook 1 rotates and the eyelet of the sling 2 disconnects from the load arm 4 of the cargo hook 1 with a weight of an attached load resulting in the load separating from the cargo hook 1. Accordingly, the cargo hook 1 typically has two externally moving parts, the first being the load arm 4 and the second being the keeper 3. In this regard, this construction of the cargo hook 1 typically allows the operator to rapidly feed on the sling 2 of the load onto the load arm 4 of the cargo hook 1 by manual movement of the keeper 3.

In some implementations, a cargo hook may be implemented as a "keeperless" cargo hook, which requires the load arm of the cargo hook to be opened and closed each time an operator needs to attach the load and sling to the cargo hook. In this regard, the "keeperless" cargo hook either does not implement a keeper or other moving structure. Only the cargo hook is configured to rotate. In situations where the aircraft is parked on the ground, operation of a "keeperless" cargo hook may be fine as there is sufficient access to all components and time is not of the essence. On the other hand, military operations, forest fire operations, and/or the like situations where time is of the essence, an operator may not have the ability, time, access, and/or the like to properly and/or efficiently operate a "keeperless" cargo hook.

Figures 10, 10A, 10B:
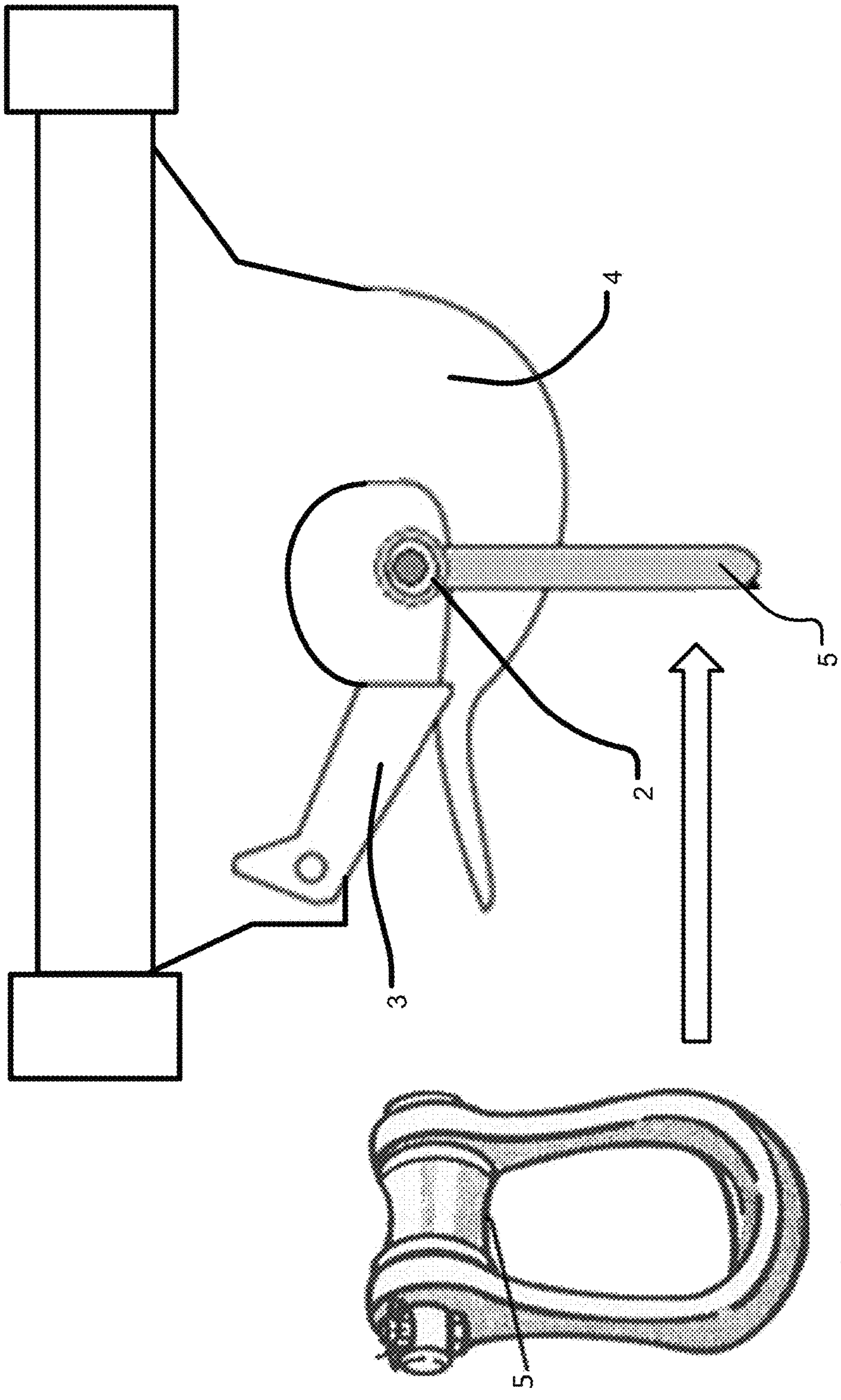
FIG. 10B PRIOR ART
FIG. 10A PRIOR ART
FIG. 10 PRIOR ART
FIG. 10 illustrates an implementation of a cargo hook and includes FIG. 10A and FIG. 10B.

FIG. 10 illustrates an implementation of a cargo hook. Another approach includes utilizing a load ring 5 as illustrated in FIG. 10. In particular, FIG. 10A illustrates the load ring 5; and FIG. 10B illustrates the load ring 5 together with the load arm 4 and the keeper 3 of the cargo hook 1. The load ring 5 typically attaches to the cargo hook 1. In this case, the load ring 5 may be referred to as an apex ring. The load ring 5 may have a special geometry, which reduces the likelihood of dynamic rollout. However, the load ring 5 may not be relied upon to be 100% safe since as it still relies on a human action.

Accordingly, there are operational benefits to having a keeper as illustrated in FIG. 9. In particular, it allows a more diverse usage of the cargo hook 1, though it comes at the price of having the inherent safety risk of dynamic rollout. Additionally, there are operational benefits to utilizing the load ring 5 as illustrated in FIG. 10. However, requiring utilization of the load ring 5 limits flexibility in the loads which may be carried by the cargo hook 1. In other words, every load must utilize the load ring 5. Aspects of the disclosure address the deficiencies described above.

The disclosure relates to a cargo hook implementing an automatic locking keeper configured to increase safety, reduce a likelihood of dynamic rollout, and/or the like, a system implementing a cargo hook utilizing an automatic locking keeper configured to increase safety, reduce a likelihood of dynamic rollout, and/or the like. More specifically, the disclosure relates to aspects of a cargo hook configured, structured, arranged, intended, and/or the like to be installed underneath an aircraft, such as a helicopter, a rotary winged aircraft, and/or the like. The configuration and intention of the cargo hook is to more safely secure loads external to the aircraft to the aircraft structure. The disclosed implementation of the cargo hook is configured, structured, implemented, and/or the like with a device, referred to as a keeper control unit, internal to the cargo hook which manipulates, controls, limits movement, locks, and/or the like a keeper.

The disclosed implementation of the cargo hook is configured, structured, implemented, and/or the like with the best features, functionality, and/or the like of typical cargo hook and enables a cargo hook with an automatically locking keeper, which is reset each time the cargo hook opens. The disclosed implementation of the cargo hook is configured, structured, implemented, and/or the like with a method and a system as described herein. In particular, the disclosed implementation of the cargo hook is configured, structured, implemented, and/or the like with a system of internal linkages, springs, detents, cams, and/or the like. In this way, the disclosed implementation of the cargo hook is configured, structured, implemented, and/or the like using mechanical parts to perform logic-based decisions on whether to configure the keeper in a locked configuration or configure the keeper in an unlocked configuration. Additionally or alternatively, the disclosed implementation of the cargo hook is configured, structured, implemented, and/or the like with electrical parts as well. In aspects, the disclosed implementation of the cargo hook is configured, structured, implemented, and/or the like with a methodology utilizing an internal mechanism to perform the logic based function of locking the keeper and/or unlocking the keeper. Additionally or alternatively, the disclosed implementation of the cargo hook is configured, structured, implemented, and/or the like with a combination of mechanical parts and electrical sensors which provide alert or notification of the status of the keeper whether locked or unlocked, or alternatively described for human recognizance and readiness.

As described herein, the mechanism allows the keeper to be opened and the load ring, tether, sling, strap, and/or the like (hereinafter I sling) installed in the cargo hook. The keeper of the cargo hook is prevented from opening once the keeper snaps shut when the sling is passed through the keeper. By opening the cargo hook, a "memory" of the keeper mechanism or keeper control unit is reset, and the keeper is now unlocked and ready to be fed another sling.

FIG. 1 illustrates a helicopter with an exemplary helicopter cargo hook system implementing a cargo hook utilizing an automatic locking keeper configured to increase safety, reduce a likelihood of dynamic rollout, and/or the like in accordance with aspects of the disclosure.

In particular, FIG. 1 shows a helicopter 100 with a cargo system 101, which may be used for external cargo transport missions, combat insertion missions, combat extraction missions, search and rescue missions, and/or the like. In certain aspects, the cargo system 101 may be implemented as a Helicopter Flight Rescue System (HFRS), a Helicopter External Transport System (NETS), and/or the like. As shown in FIG. 1, the cargo system 101 may be positioned on a lower side of the aircraft and may be attached directly or indirectly to the helicopter 100. In other aspects, the cargo system 101 may be mounted to a side of the helicopter 100, may be mounted internally to the helicopter 100, and/or the like.

Although FIG. 1 depicts a helicopter as the exemplary airborne platform, the cargo system 101 and its associated principles and/or methodologies described herein, are not limited to helicopters, and may be applied to any airborne platform. For example, the cargo system 101 may be attached directly or indirectly to a cargo helicopter (not shown), such as mounted underneath an aircraft fuselage, mounted to a tilt rotor aircraft, an aerial crane, a flying crane, and/or the like. The cargo system 101 may also be coupled to an autonomous or remote-controlled aircraft, such as an unmanned aerial vehicle (UAV), unmanned aircraft system (UAS), a drone, a fixed wing aircraft, and/or the like. Of course, the cargo system 101 may also be implemented in static configurations, non-aircraft based configurations, and/or the like.

Referring further to FIG. 1, the cargo system 101 may include a cargo hook 102 and a cable 104. As appreciated by one skilled in the art with the benefit of this disclosure, the cargo hook 102 may be connected directly or indirectly to the cable 104. The cable may be substituted with multiple cables and paired with multiple cargo hooks for multi-point stability to the aircraft. In aspects, a spring-interface device (not shown) may be connected between the cable 104 and the cargo hook 102. In other aspects, the cable 104 may be connected to the cargo hook 102 through other intervening structure including mechanical fasteners.

Additionally, the cargo hook 102 may include a keeper control unit 124. In particular, the disclosed implementation of the cargo hook 102 together with the keeper control unit 124 may reduce the likelihood that a load 190 may be inadvertently released from the helicopter 100 and/or the cargo hook 102 as further described herein.

Figure 2:
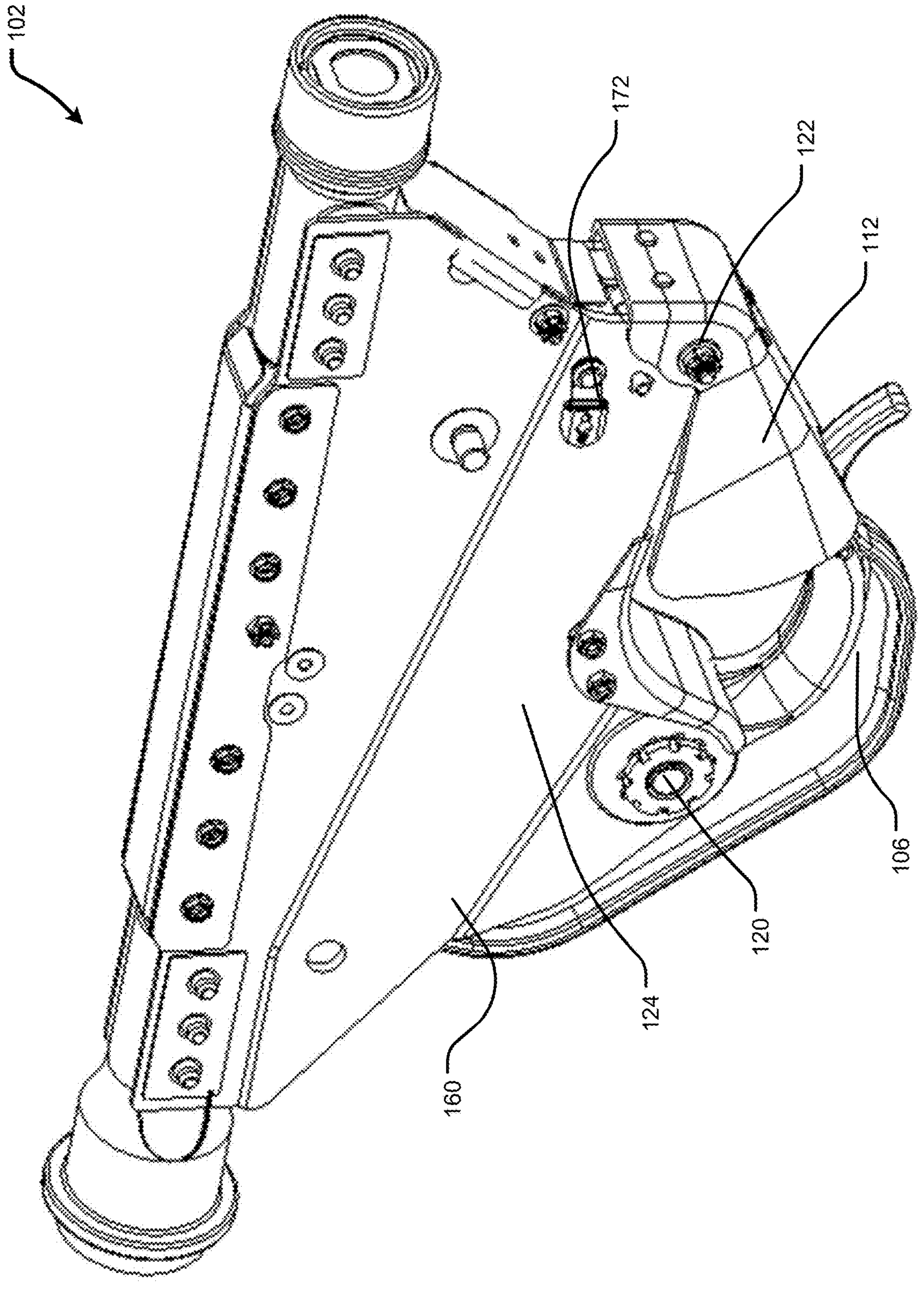
FIG. 2 illustrates an enlarged first side view of the cargo hook shown in FIG. 1.

FIG. 2 illustrates an enlarged first side view of the cargo hook shown in FIG. 1.

Figure 3:
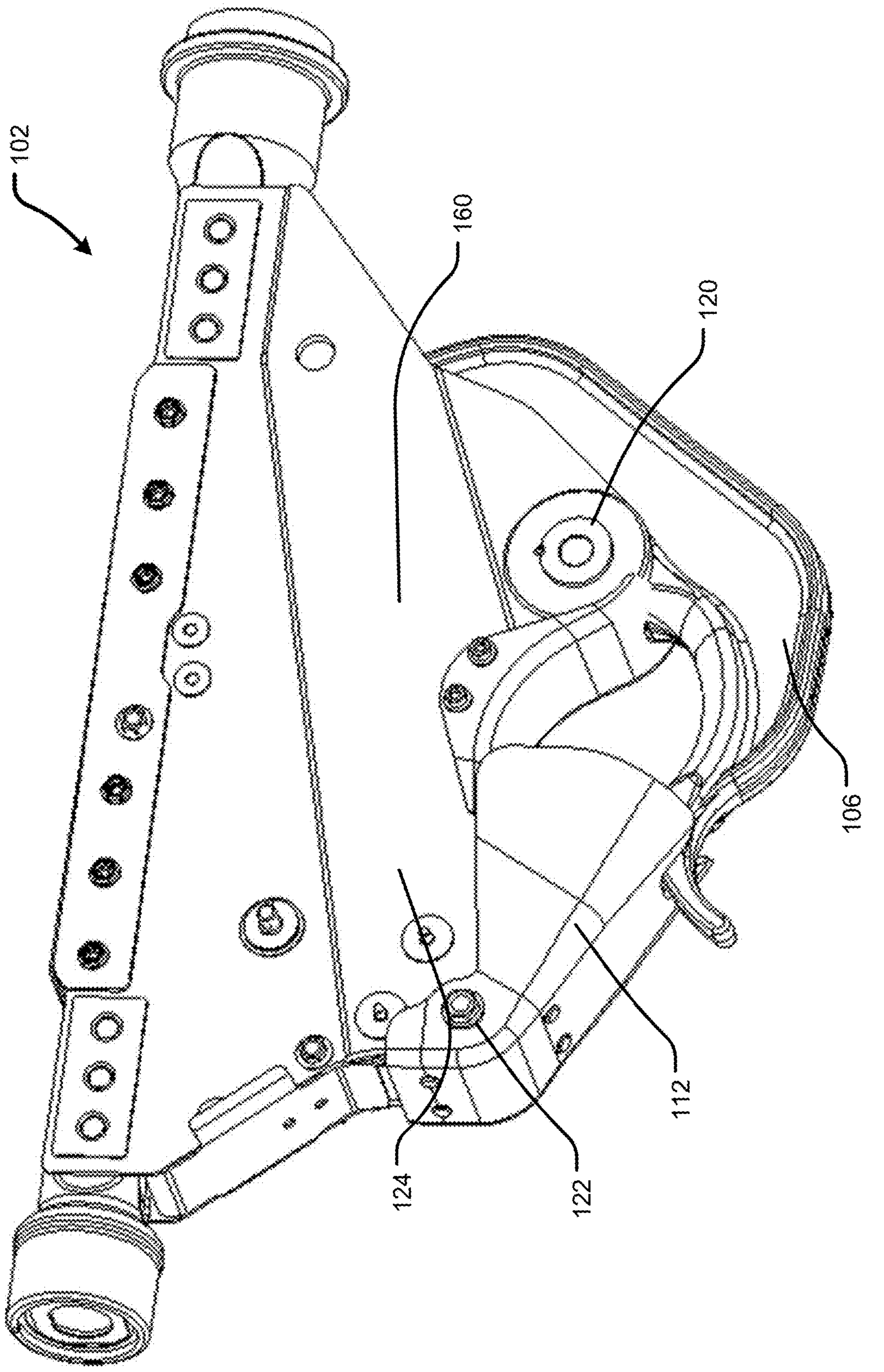
FIG. 3 illustrates an enlarged second side view of the cargo hook shown in FIG. 1.

FIG. 3 illustrates an enlarged second side view of the cargo hook shown in FIG. 1.

Referring to FIG. 2 and FIG. 3, the cargo hook 102 may include a load arm 106, a keeper 112, the keeper control unit 124, and/or the like. More specifically, the keeper 112 may be pivotally attached to the main body of the cargo hook 102 through a keeper pivot connection 122. In this regard, the keeper control unit 124 may have a keeper locked configuration that locks movement of the keeper 112 about the keeper pivot connection 122 with respect to the cargo hook 102. Additionally, the keeper control unit 124 may have a keeper unlocked configuration that allows movement of the keeper 112 about the keeper pivot connection 122 with respect to the cargo hook 102.

In aspects, the cargo hook 102 implementing the keeper control unit 124 may be configured, structured, arranged, intended, and/or the like to be installed underneath an aircraft, such as a helicopter, a rotary winged aircraft, and/or the like. The configuration and implementation the cargo hook 102 implementing the keeper control unit 124 results in a more safe and secure connection to the load 190 external to the helicopter 100. The keeper control unit 124 may be implemented internal to the cargo hook 102. Moreover, the keeper control unit 124 may be configured to manipulate, control, limit movement, lock, and/or the like the keeper 112.

Figure 8:
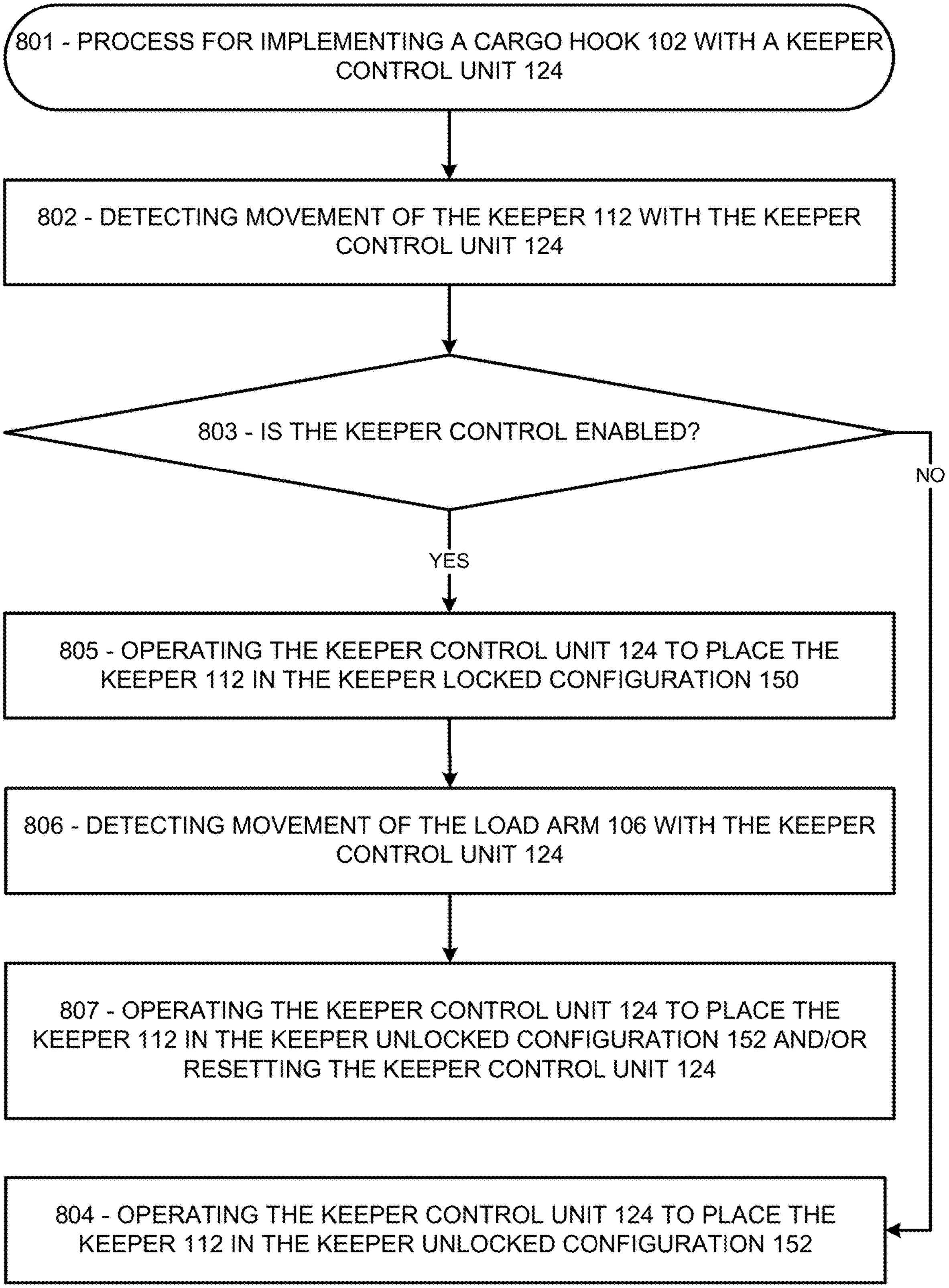
FIG. 8 illustrates an exemplary process for implementing a cargo hook with a keeper control unit in accordance with aspects of the disclosure.

The disclosed implementation of the cargo hook 102 together with the keeper control unit 124 may be configured, structured, implemented, and/or the like with a method as illustrated in FIG. 8 and a system as described herein. In particular, the cargo hook 102 together with the keeper control unit 124 may be configured, structured, implemented, and/or the like with a system of internal linkages, springs, detents, cams, and/or the like. In this way, the cargo hook 102 together with the keeper control unit 124 may be configured, structured, implemented, and/or the like using mechanical parts to perform logic-based decisions on whether to configure the keeper 112 in a locked configuration or configure the keeper 112 in an unlocked configuration. Additionally or alternatively, the cargo hook 102 together with the keeper control unit 124 may be configured, structured, implemented, and/or the like with electrical parts as well. In aspects, the cargo hook 102 together with the keeper control unit 124 may be configured, structured, implemented, and/or the like with a methodology utilizing an internal mechanism to perform the logic based function of locking the keeper and/or unlocking the keeper.

Figure 5:
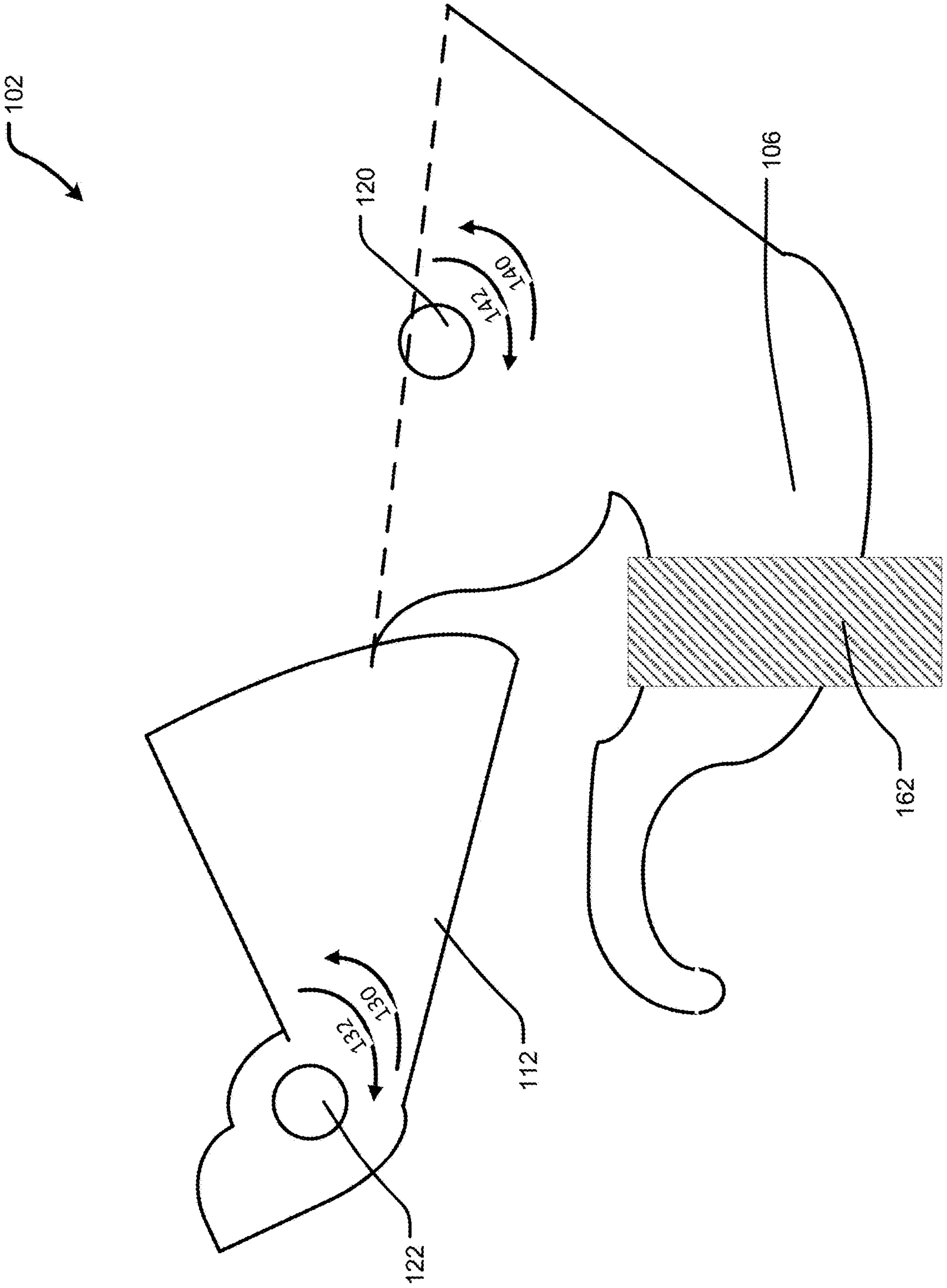
FIG. 5 illustrates a partial side view of the cargo hook shown in FIG. 1 with a keeper opened.

As described herein, the cargo hook 102 together with the keeper control unit 124 may allow the keeper 112 to be opened and a sling 162, a tether, a load ring, a strap, and/or the like (hereinafter sling 162) installed in the cargo hook 102 as illustrated in FIG. 5. The keeper 112 of the cargo hook 102 may be prevented from opening once the keeper 112 snaps shut when the load ring is passed through the keeper 112. By opening the keeper 112, a "memory" of the keeper control unit 124 may be reset, and the keeper 112 may now be unlocked and ready to be fed another load ring. The keeper 112 mechanically interacts with the load arm 106 to preclude the load 190 from inadvertently disengaging from the cargo hook 102 during transport of such cargo responsive to the keeper control unit 124.

Additionally, the cargo hook 102 may include a hook disengage unit 160 that may be operative to facilitate the release of the load 190 from the load arm 106. In particular, the load arm 106 may be pivotally attached to a main body of the cargo hook 102 through a load arm pivot connection 120. In this regard, the hook disengage unit 160 may have a locked configuration that locks movement of the load arm 106 about the load arm pivot connection 120 with respect to the cargo hook 102. Additionally, the hook disengage unit 160 may have an unlocked configuration that allows movement of the load arm 106 about the load arm pivot connection 120 with respect to the cargo hook 102.

The hook disengage unit 160 may include components that may electrically, pneumatically, hydraulically, and/or the like allow the load arm 106 to rotate an open. The hook disengage unit 160 may be operative, in response to actuation to unlock the load arm 106 and allow the load arm 106 to rotate about the load arm pivot connection 120 to release cargo, disengage cargo, jettison cargo, and/or the like. The hook disengage unit 160 may be connected with an emergency cargo-release subsystem in an arrangement that controls the status of the load arm 106 in combination with the cargo hook 102. The cargo hook 102 may include one or more release systems to facilitate the immediate jettison of externally attached cargo in the event of an emergency situation.

The cargo hook 102 may include the main body that may include a first side plate and a second side plate. The components of the cargo hook 102 may include lightweight materials. The materials employed may be high strength metal alloys having a relatively low density. Other high strength aluminum alloys, titanium metal alloys and other metallic and non-metallic high strength materials, including various reinforced and composite materials may also be suitable.

Figure 4:
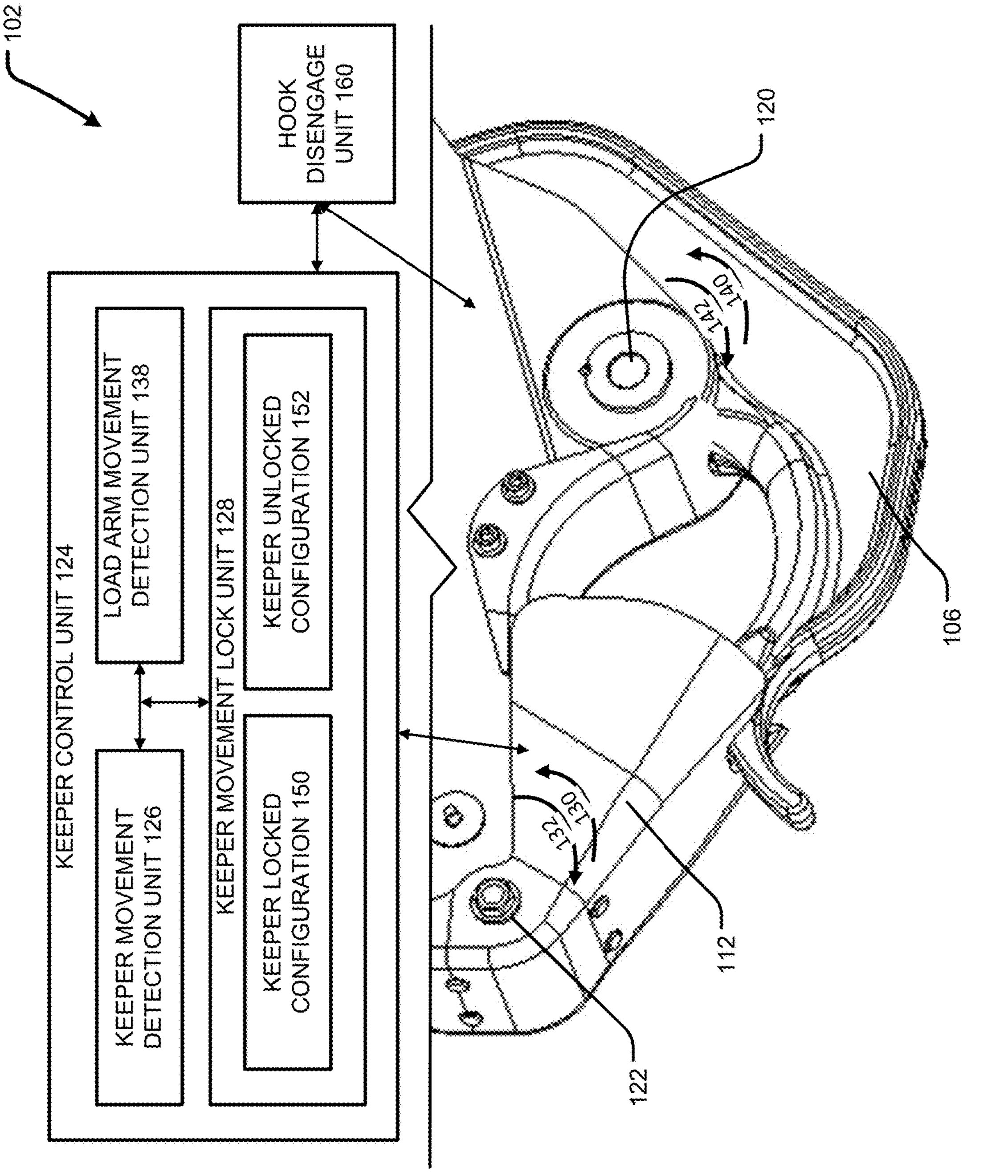
FIG. 4 illustrates a partial side view of the cargo hook shown in FIG. 1 and the keeper control unit according to aspects of the disclosure.

FIG. 4 illustrates a partial side view of the cargo hook shown in FIG. 1 and the keeper control unit according to aspects of the disclosure.

FIG. 5 illustrates a partial side view of the cargo hook shown in FIG. 1 with a keeper opened.

Figure 6:
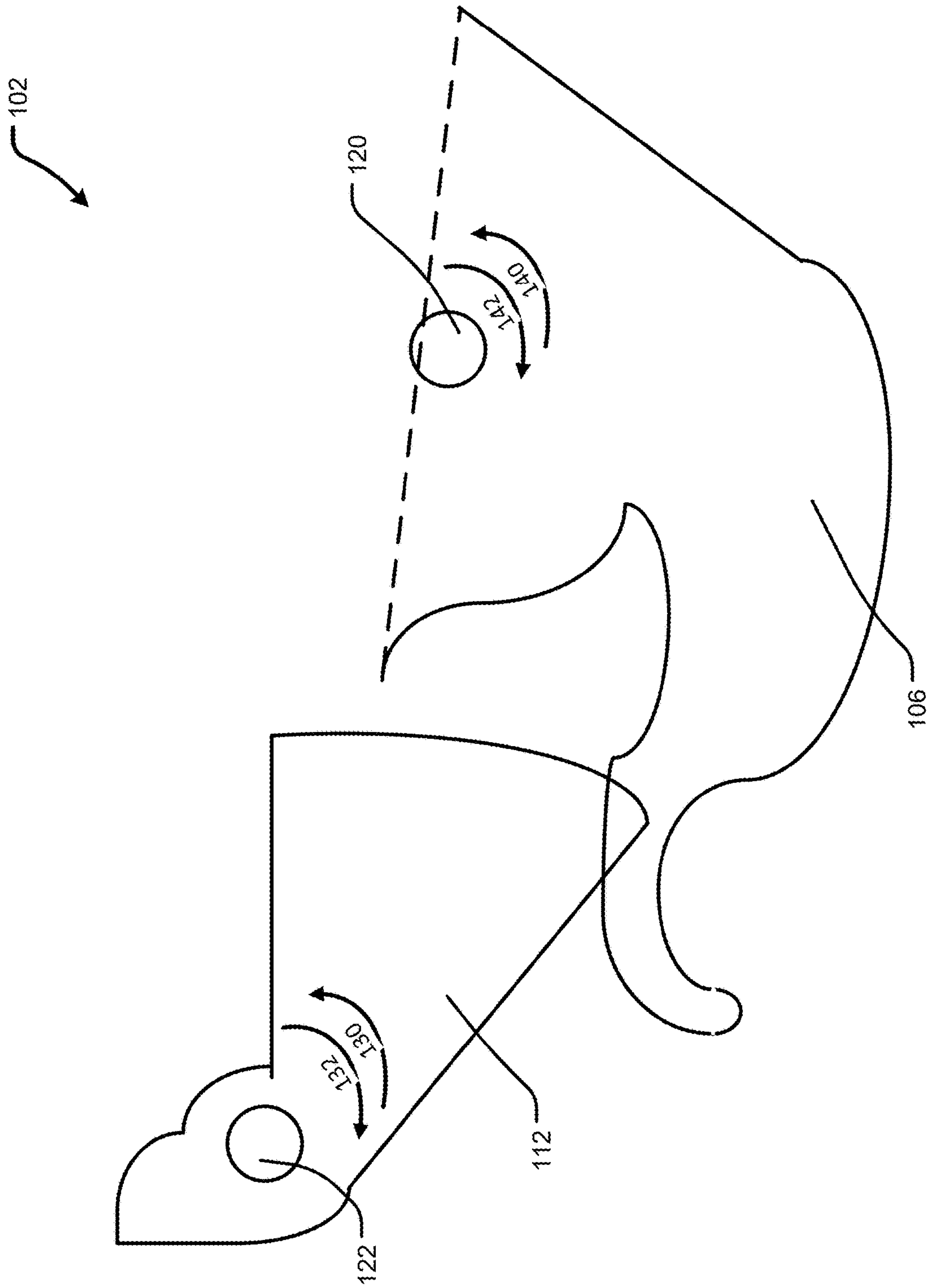
FIG. 6 illustrates a partial side view of the cargo hook shown in FIG. 1 with a keeper closed.

FIG. 6 illustrates a partial side view of the cargo hook shown in FIG. 1 with a keeper closed.

Figure 7:
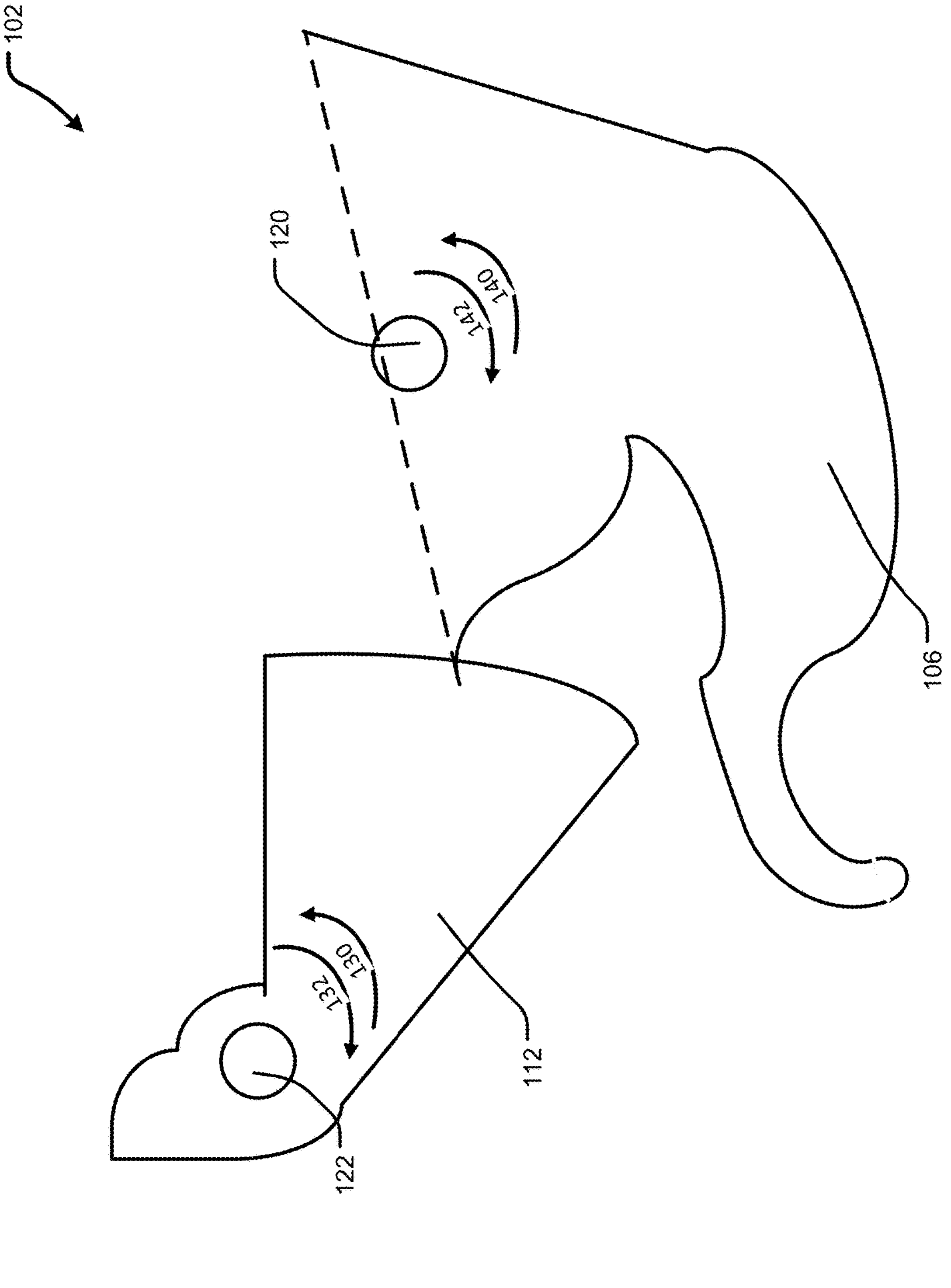
FIG. 7 illustrates a partial side view of the cargo hook shown in FIG. 1 with a load arm opened.

FIG. 7 illustrates a partial side view of the cargo hook shown in FIG. 1 with a load arm opened.

In particular, FIG. 4 illustrates exemplary components of the keeper control unit 124. In this regard, the keeper control unit 124 may include a keeper movement detection unit 126, a keeper movement lock unit 128, a load arm movement detection unit 138, and/or the like. The exemplary components of the keeper control unit 124 may be mechanical components, electrical components, circuits, processors, sensors, and/or the like. Moreover, the various aspects and functions of the exemplary components of the keeper control unit 124 may be combined and/or separated depending on implementation thereof. Additionally, the keeper control unit 124 may be implemented with components configured to operate consistent with each of the above-noted components.

The keeper movement detection unit 126 may be configured to detect and/or indicate movement of the keeper 112. For example, the keeper movement detection unit 126 may detect and/or indicate a particular movement of the keeper 112, the position of the keeper 112, an unlocking of the keeper 112, a locking of the keeper 112, and/or the like. In particular, the keeper movement detection unit 126 may be configured to detect and/or indicate a keeper opening movement 130 and/or the keeper movement detection unit 126 may be configured to detect a keeper closing movement 132 as illustrated by the arrows in FIG. 4.

The keeper movement detection unit 126 may be configured to detect and/or indicate movement of the keeper 112 with mechanical components, electrical components, and/or the like. In aspects, the keeper movement detection unit 126 may be configured to detect and/or indicate movement of the keeper 112 with one or more of a ratchet, a pawl, a cam, a spring, a detent, a linkage, a dash pot, a spring—mass system, a lever, a gear, and/or the like. The arrangement of these components may change and accordingly may be configured to detect, store information, provide an indication, and/or the like consistent with the operation of the keeper movement detection unit 126 described herein. In aspects, the keeper movement detection unit 126 may be configured to detect and/or indicate movement of the keeper 112 with one or more of a circuit, a processor, a memory, a sensor, and/or the like to detect, store information, provide an indication and/or the like consistent with the operation of the keeper movement detection unit 126 described herein. The sensors may be implemented as one or more of a position sensor, a movement sensor, and/or the like.

As illustrated in FIG. 5, the keeper 112 has been manipulated by an operator to be opened to allow the sling 162 and/or the load 190 to be arranged on the load arm 106. Thereafter, the operator may release the keeper 112 and the keeper 112 may be moved by spring bias force to a closed position as illustrated in FIG. 6

FIG. 6 illustrates that the keeper 112 is closed, which may include contact or close proximity to the load arm 106 thus securing the sling 162 and/or the load 190. Accordingly, the keeper control unit 124 may be configured to detect the keeper opening movement 130 and/or the keeper closing movement 132 related to the sling 162 and/or the load 190 being arranged on the load arm 106.

The keeper movement lock unit 128 may be responsive to the keeper movement detection unit 126 and after the keeper movement detection unit 126 detects movement of the keeper 112, such as the keeper opening movement 130 and/or the keeper closing movement 132, the keeper movement lock unit 128 operates to lock the keeper 112 such that the keeper 112 cannot be otherwise be manually moved, for example, in the keeper opening movement 130 and/or the keeper closing movement 132 until the keeper control unit 124 and/or the keeper movement lock unit 128 is reset as further described below.

In other words, the keeper movement lock unit 128 locks movement of the keeper 112 about the keeper pivot connection 122 after an initial movement of the keeper 112 to prevent the load 190 from being released from the load arm 106 until the keeper control unit 124 and/or the keeper movement lock unit 128 is reset as further described below.

More specifically, the keeper movement lock unit 128 may be configured to have a keeper locked configuration 150 that locks movement of the keeper 112; and the keeper movement lock unit 128 is configured to have a keeper unlocked configuration 152 that unlocks and/or allows movement of the keeper 112. In aspects, the keeper movement lock unit 128 is configured to have the keeper locked configuration 150 that locks movement of the keeper 112 after the keeper movement detection unit 126 detects the keeper opening movement 130 and/or the keeper closing movement 132.

The keeper movement lock unit 128 may be implemented with one or more of a ratchet, a pawl, a cam, a spring, a detent, a linkage, a dash pot, a spring—mass system, a lever, a gear, and/or the like. The arrangement of these components may change and accordingly may be configured to implement the operation of the keeper movement lock unit 128 described herein. In aspects, the keeper movement lock unit 128 may be configured to lock movement of the keeper 112 with one or more of a circuit, a processor, a memory, an actuator, a solenoid, and/or the like to lock the keeper 112 consistent with the operation of keeper movement lock unit 128 described herein.

In aspects, the cargo hook 102 may further include a selector unit 172 as illustrated in FIG. 2. The selector unit 172 may include a mechanical button, lever, switch, and/or the like. In other aspects, the selector unit 172 may be an electrical button, lever, switch, and/or the like. Moreover, the selector unit 172 may have two operating positions. In this regard, the selector unit 172 may have a first position enabling operation of the keeper movement lock unit 128 and/or the keeper control unit 124 as described above to place the keeper 112 in the keeper unlocked configuration 152; and the selector unit 172 may have a second position disabling operation of the keeper movement lock unit 128 and/or the keeper control unit 124 as described above to operate the keeper 112 in the keeper locked configuration 150.

The selector unit 172 may be configured with mechanical components, electrical components, and/or the like. In aspects, the selector unit 172 may be configured with one or more of a ratchet, a pawl, a cam, a spring, a detent, a linkage, a dash pot, a spring—mass system, a lever, a gear, and/or the like. The arrangement of these components may change and accordingly may be configured to detect, store information, provide an indication, and/or the like consistent with the selector unit 172 described herein. In aspects, the selector unit 172 may be configured with one or more of a circuit, the processor, a memory, a sensor, and/or the like to detect, store information, provide an indication and/or the like consistent with the selector unit 172 described herein. The sensors may be implemented as one or more of a position sensor, a movement sensor, and/or the like. In this regard, the 124 may be responsive to the selector unit 172 in order to enable the 124 and/or disable the 124.

The load arm movement detection unit 138 may be configured to detect movement of the load arm 106 including a load arm movement, a load arm position, a load arm unlocking, a load arm locking, and/or the like. In particular, the load arm movement detection unit 138 may be configured to detect a load arm opening movement 140 and/or the load arm movement detection unit 138 may be configured to detect a load arm closing movement 142. As illustrated in FIG. 7, the load arm 106 has been manipulated by an operator to be opened and the load arm movement detection unit 138 may be configured to detect the load arm opening movement 140 and/or the load arm closing movement 142.

The load arm movement detection unit 138 may be configured to detect and/or indicate movement of the load arm 106 with mechanical components, electrical components, and/or the like. In aspects, the load arm movement detection unit 138 may be configured to detect and/or indicate movement of the load arm 106 with one or more of a ratchet, a pawl, a cam, a spring, a detent, a linkage, a dash pot, a spring—mass system, a lever, a gear, and/or the like. The arrangement of these components may change and accordingly may be configured to detect, store information, provide an indication, and/or the like consistent with the operation of the load arm movement detection unit 138 described herein. In aspects, the load arm movement detection unit 138 may be configured to detect and/or indicate movement of the load arm 106 with one or more of a circuit, the processor, a memory, a sensor, and/or the like to detect, store information, provide an indication and/or the like consistent with the operation of the load arm movement detection unit 138 described herein. The sensors may be implemented as one or more of a position sensor, a movement sensor, and/or the like.

The keeper control unit 124 and/or the keeper movement lock unit 128 may be configured to receive an indication from the load arm movement detection unit 138 that has detected the load arm opening movement 140 and/or the load arm closing movement 142. Thereafter, the keeper control unit 124 and/or the keeper movement lock unit 128 may be reset and the keeper 112 is unlocked and/or the keeper is placed in the keeper unlocked configuration 152. In other words, resetting the keeper control unit 124 and/or the keeper movement lock unit 128 in response to the load arm movement detection unit 138 may allow the keeper 112 to now be configured to be operated in the keeper opening movement 130 and/or the keeper closing movement 132.

As a particular example, the cargo hook 102 and/or the keeper control unit 124 illustrated FIG. 4 may have been previously reset and may currently be in the keeper unlocked configuration 152. As shown in FIG. 5, an operator may manipulate the keeper 112 to move the keeper 112 in the keeper opening movement 130 to place the sling 162 on the load arm 106. Thereafter, the keeper 112 may move in the keeper closing movement 132. The keeper control unit 124 may then configure the keeper 112 to be in the keeper locked configuration 150 as illustrated in FIG. 6. Finally, an operator may operate the hook disengage unit 160 to allow the load arm 106 of the cargo hook 102 to move with the load arm opening movement 140. Thereafter, the keeper control unit 124 and/or the keeper movement lock unit 128 may be configured in the keeper unlocked configuration 152.

FIG. 8 illustrates an exemplary process for implementing a cargo hook with a keeper control unit in accordance with aspects of the disclosure.

In particular, FIG. 8 illustrates a process for implementing a cargo hook with a keeper control unit 801 as a collection of blocks in a logical flow graph, which represent a sequence of operations that can be implemented in mechanical components, electrical components, hardware, software, and/or a combination thereof. The order in which the operations are described with respect to the process for implementing a cargo hook with a keeper control unit 801 is not intended to be construed as a limitation, and any number of the described blocks can be combined in any order and/or in parallel to implement the process. Also, one or more of the described blocks may be omitted without departing from the scope of the present disclosure.

Additionally, it should be noted that the process for implementing a cargo hook with a keeper control unit 801 is merely exemplary and may be modified consistent with the various aspects disclosed herein. In this regard, the process for implementing a cargo hook with a keeper control unit 801 may include a process for implementing a cargo hook 102 with a keeper control unit 124 as described herein.

The process for implementing a cargo hook with a keeper control unit 801 may include detecting movement of the keeper with the keeper control unit 802. In particular, the detecting movement of the keeper with the keeper control unit 802 may include detecting movement of the keeper 112 with the keeper control unit 124 as described herein.

The process for implementing a cargo hook with a keeper control unit 801 may include determining whether the keeper control is enabled 803. In particular, the determining whether the keeper control is enabled 803 may include determining whether the selector unit 172 is enabled or the selector unit 172 is disabled. If the selector unit 172 is enabled, the process for implementing a cargo hook with a keeper control unit 801 may advance to operating the keeper control unit to place the keeper in the keeper unlocked configuration 804. On the other hand, if the selector unit 172 is disabled, the process for implementing a cargo hook with a keeper control unit 801 may advance to operating the keeper control unit to place the keeper in the keeper locked configuration 805.

The process for implementing a cargo hook with a keeper control unit 801 may include operating the keeper control unit to place the keeper in the keeper unlocked configuration 804. In particular, the operating the keeper control unit to place the keeper in the keeper unlocked configuration 804 may include operating the keeper control unit 124 to place the keeper 112 in the keeper unlocked configuration 152 as described herein.

The process for implementing a cargo hook with a keeper control unit 801 may include operating the keeper control unit to place the keeper in the keeper locked configuration 805. In particular, the operating the keeper control unit to place the keeper in the keeper locked configuration 805 may include operating the keeper control unit 124 to place the keeper 112 in the keeper locked configuration 150 as described herein.

The process for implementing a cargo hook with a keeper control unit 801 may include detecting movement of the load arm with the keeper control unit 806. In particular, the detecting movement of the load arm with the keeper control unit 806 may include detecting movement of the load arm 106 with the keeper control unit 124 as described herein.

The process for implementing a cargo hook with a keeper control unit 801 may include operating the keeper control unit to place the keeper in the keeper unlocked configuration and/or resetting the keeper control unit 807. In particular, the operating the keeper control unit to place the keeper in the keeper unlocked configuration and/or resetting the keeper control unit 807 may include operating the keeper control unit 124 to place the keeper 112 in the keeper unlocked configuration 152 and/or resetting the keeper control unit 124 as described herein.

As may be appreciated by those skilled in the art, the illustrated structure is a logical structure and not a physical one. Accordingly, the illustrated modules can be implemented by employing various hardware and software components. In addition, two or more of the logical components can be implemented as a single module that provides functionality for both components. In one aspect, the components are implemented as software program modules.

The following are a number of nonlimiting EXAMPLES of aspects of the disclosure. One EXAMPLE includes: EXAMPLE 1. A cargo hook includes: a main body; a load arm configured to be pivotally attached to the main body with a load arm pivot connection; a keeper configured to be pivotally attached to the main body through a keeper pivot connection; and a keeper control unit configured to have a keeper locked configuration that locks movement of the keeper about the keeper pivot connection with respect to the main body.

The above-noted EXAMPLE may further include any one or a combination of more than one of the following EXAMPLES: 2. The cargo hook of any EXAMPLE herein where the keeper control unit is further configured to have a keeper unlocked configuration that allows movement of the keeper about the keeper pivot connection with respect to the main body. 3. The cargo hook of any EXAMPLE herein where the keeper control unit includes mechanical parts configured to configure the keeper in a locked configuration and configure the keeper in an unlocked configuration. 4. The cargo hook of any EXAMPLE herein where the keeper control unit includes electrical parts configured to configure the keeper in a locked configuration and configure the keeper in an unlocked configuration. 5. The cargo hook of any EXAMPLE herein where the keeper control unit is further configured to allow the keeper to be opened and a sling, a tether, a load ring, and/or a strap be located on the load arm. 6. The cargo hook of any EXAMPLE herein where the keeper control unit is further configured to prevent the keeper from opening once the keeper closes. 7. The cargo hook of any EXAMPLE herein includes: a hook disengage unit configured to have a locked configuration that locks movement of the load arm about the load arm pivot connection with respect to the main body; and the hook disengage unit configured to have an unlocked configuration that allows movement of the load arm about the load arm pivot connection with respect to the main body. 8. The cargo hook of any EXAMPLE herein where the keeper control unit includes: a keeper movement detection unit; a keeper movement lock unit; and a load arm movement detection unit. 9. The cargo hook of any EXAMPLE herein where the keeper movement detection unit is configured to detect and/or indicate movement of the keeper. 12. The cargo hook of any EXAMPLE herein where the keeper movement lock unit being configured to be responsive to the keeper movement detection unit; and where after the keeper movement detection unit detects movement of the keeper, the keeper movement lock unit operates to lock the keeper. 10. The cargo hook of any EXAMPLE herein where the keeper movement detection unit is configured to detect and/or indicate a keeper opening movement and/or a keeper closing movement. 11. The cargo hook of any EXAMPLE herein where the keeper movement detection unit is configured to detect and/or indicate movement of the keeper with mechanical components and/or electrical components. 13. The cargo hook of any EXAMPLE herein where the keeper movement lock unit is configured to lock movement of the keeper about the keeper pivot connection after an initial movement of the keeper. 14. The cargo hook of any EXAMPLE herein where the keeper movement lock unit is configured to have a keeper locked configuration that locks movement of the keeper; and where the keeper movement lock unit is configured to have a keeper unlocked configuration that unlocks movement of the keeper. 15. The cargo hook of any EXAMPLE herein where the keeper movement lock unit is configured to have the keeper locked configuration that locks movement of the keeper after the keeper movement detection unit detects a keeper opening movement and/or a keeper closing movement. 16. The cargo hook of any EXAMPLE herein includes: a selector unit includes a first configuration disabling operation of the keeper movement lock unit to place the keeper in a keeper unlocked configuration; and the selector unit includes a second configuration enabling operation of the keeper movement lock unit and/or the keeper control unit to operate the keeper in a keeper locked configuration. 17. The cargo hook of any EXAMPLE herein where the load arm movement detection unit is configured to detect and/or indicate movement of the load arm. 18. The cargo hook of any EXAMPLE herein where the keeper control unit and/or the keeper movement lock unit being configured to receive an indication from the load arm movement detection unit that has detected a load arm opening movement and/or a load arm closing movement; and where the keeper control unit and/or the keeper movement lock unit thereafter being reset and the keeper being placed in a keeper unlocked configuration.

One EXAMPLE includes: EXAMPLE 19. A process of implementing a cargo hook includes: providing a main body; providing a load arm configured to be pivotally attached to the main body with a load arm pivot connection; providing a keeper configured to be pivotally attached to the main body through a keeper pivot connection; and providing a keeper control unit configured to have a keeper locked configuration that locks movement of the keeper about the keeper pivot connection with respect to the main body.

The above-noted EXAMPLE may further include any one or a combination of more than one of the following EXAMPLES: 20. The process of implementing a cargo hook of any EXAMPLE herein where the keeper control unit is further configured to have a keeper unlocked configuration that allows movement of the keeper about the keeper pivot connection with respect to the main body. 21. The process of implementing a cargo hook of any EXAMPLE herein where the keeper control unit includes mechanical parts configured to configure the keeper in a locked configuration and configure the keeper in an unlocked configuration. 22. The process of implementing a cargo hook of any EXAMPLE herein where the keeper control unit includes electrical parts configured to configure the keeper in a locked configuration and configure the keeper in an unlocked configuration. 23. The process of implementing a cargo hook of any EXAMPLE herein where the keeper control unit is further configured to allow the keeper to be opened and a sling, a tether, a load ring, and/or a strap be located on the load arm. 24. The process of implementing a cargo hook of any EXAMPLE herein where the keeper control unit is further configured to prevent the keeper from opening once the keeper closes. 25. The process of implementing a cargo hook of any EXAMPLE herein includes: providing a hook disengage unit configured to have a locked configuration that locks movement of the load arm about the load arm pivot connection with respect to the main body; and configuring the hook disengage unit to have an unlocked configuration that allows movement of the load arm about the load arm pivot connection with respect to the main body. 26. The process of implementing a cargo hook of any EXAMPLE herein where the keeper control unit includes: providing a keeper movement detection unit; providing a keeper movement lock unit; and providing a load arm movement detection unit. 27. The process of implementing a cargo hook of any EXAMPLE herein where the keeper movement detection unit is configured to detect and/or indicate movement of the keeper. 28. The process of implementing a cargo hook of any EXAMPLE herein where the keeper movement detection unit is configured to detect and/or indicate a keeper opening movement and/or a keeper closing movement. 29. The process of implementing a cargo hook of any EXAMPLE herein where the keeper movement detection unit is configured to detect and/or indicate movement of the keeper with mechanical components and/or electrical components. 30. The process of implementing a cargo hook of any EXAMPLE herein where the keeper movement lock unit being configured to be responsive to the keeper movement detection unit; and where after the keeper movement detection unit detects movement of the keeper, the keeper movement lock unit operates to lock the keeper. 31. The process of implementing a cargo hook of any EXAMPLE herein where the keeper movement lock unit is configured to lock movement of the keeper about the keeper pivot connection after an initial movement of the keeper. 32. The process of implementing a cargo hook of any EXAMPLE herein where the keeper movement lock unit is configured to have a keeper locked configuration that locks movement of the keeper; and where the keeper movement lock unit is configured to have a keeper unlocked configuration that unlocks movement of the keeper. 33. The process of implementing a cargo hook of any EXAMPLE herein where the keeper movement lock unit is configured to have the keeper locked configuration that locks movement of the keeper after the keeper movement detection unit detects a keeper opening movement and/or a keeper closing movement. 34. The process of implementing a cargo hook of any EXAMPLE herein includes: providing a selector unit includes a first configuration disabling operation of the keeper movement lock unit to place the keeper in a keeper unlocked configuration; and configuring the selector unit to have a second configuration enabling operation of the keeper movement lock unit and/or the keeper control unit to operate the keeper in a keeper locked configuration. 35. The process of implementing a cargo hook of any EXAMPLE herein where the load arm movement detection unit is configured to detect and/or indicate movement of the load arm. 36. The process of implementing a cargo hook of any EXAMPLE herein where the keeper control unit and/or the keeper movement lock unit being configured to receive an indication from the load arm movement detection unit that has detected a load arm opening movement and/or a load arm closing movement; and where the keeper control unit and/or the keeper movement lock unit thereafter being reset and the keeper being placed in a keeper unlocked configuration.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

The invention claimed is:

1. A cargo hook comprising:
a main body;
a load arm configured to be pivotally attached to the main body with a load arm pivot connection;
a keeper configured to be pivotally attached to the main body through a keeper pivot connection;
a keeper control unit configured to have a keeper locked configuration that locks movement of the keeper about the keeper pivot connection with respect to the main body; and
a load arm movement detection unit configured to detect and/or indicate movement of the load arm,
wherein the keeper control unit comprises:
a keeper movement detection unit configured to detect and/or indicate movement of the keeper;
a keeper movement lock unit configured to lock movement of the keeper about the keeper pivot connection after an initial movement of the keeper,
wherein the keeper movement lock unit is responsive to the keeper movement detection unit such that after the keeper movement detection unit detects movement of the keeper, the keeper movement lock unit operates to lock the keeper,
wherein the keeper control unit and/or the keeper movement lock unit is configured to receive an indication from the load arm movement detection unit that has detected a load arm opening movement and/or a load arm closing movement, and
wherein the keeper control unit and/or the keeper movement lock unit is thereafter reset and the keeper is placed in a keeper unlocked configuration.

2. The cargo hook of claim 1
wherein the keeper control unit is further configured to have the keeper unlocked configuration that allows movement of the keeper about the keeper pivot connection with respect to the main body, and wherein the keeper is placed in the keeper unlocked configuration after the keeper control unit and/or the keeper movement lock unit is reset in response to the indication from the load arm movement detection unit.

3. The cargo hook of claim 1 wherein the keeper control unit comprises mechanical parts configured to configure the keeper in a locked configuration and configure the keeper in an unlocked configuration, and wherein the mechanical parts comprising one or more internal linkages, springs, detents, and cams configured to perform logic-based decisions on whether to configure the keeper in the locked configuration or configure the keeper in the unlocked configuration.

4. The cargo hook of claim 1 wherein the keeper control unit comprises electrical parts configured to configure the keeper in a locked configuration and configure the keeper in an unlocked configuration, and wherein the electrical parts comprising one or more sensors configured to provide an alert or notification of a status of the keeper as locked or unlocked.

5. The cargo hook of claim 1 wherein the keeper control unit is further configured to allow the keeper to be opened and a sling, a tether, a load ring, and/or a strap be located on the load arm, and wherein the keeper is manually movable to an opened position while the load arm remains in a closed position to permit installation of the sling, tether, load ring, and/or strap on the load arm.

6. The cargo hook of claim 5 wherein the keeper control unit is further configured to prevent the keeper from opening once the keeper closes, and wherein once the keeper snaps shut after the sling, tether, load ring, and/or strap is passed through the keeper, movement of the keeper is prevented until the keeper control unit and/or the keeper movement lock unit is reset.

7. The cargo hook of claim 1 further comprising:

a hook disengage unit configured to have a locked configuration that locks movement of the load arm about the load arm pivot connection with respect to the main body; and the hook disengage unit configured to have an unlocked configuration that allows movement of the load arm about the load arm pivot connection with respect to the main body, wherein the hook disengage unit is operative, in response to actuation, to unlock the load arm and allow the load arm to rotate about the load arm pivot connection to release cargo, disengage cargo, and/or jettison cargo.

8. The cargo hook of claim 1 wherein the keeper control unit comprises:

the keeper movement detection unit;

the keeper movement lock unit; and the load arm movement detection unit, wherein the keeper movement detection unit, the keeper movement lock unit, and the load arm movement detection unit are arranged within the keeper control unit internal to the cargo hook.

9. The cargo hook of claim 8 wherein the keeper movement detection unit is configured to detect and/or indicate movement of the keeper, including detecting and/or indicating a particular movement of the keeper, a position of the keeper, an unlocking of the keeper, and a locking of the keeper.

10. The cargo hook of claim 9, wherein the keeper movement lock unit being configured to be responsive to the keeper movement detection unit; and wherein after the keeper movement detection unit being configured to detect movement of the keeper, the keeper movement lock unit operates to lock the keeper, such that the keeper cannot otherwise be manually moved until the keeper control unit and/or the keeper movement lock unit is reset.

11. The cargo hook of claim 8 wherein the keeper movement detection unit is configured to detect and/or indicate a keeper opening movement and/or a keeper closing movement, and wherein the keeper movement detection unit is configured to detect both the keeper opening movement and the keeper closing movement.

12. The cargo hook of claim 8 wherein the keeper movement detection unit is configured to detect and/or indicate movement of the keeper with mechanical components and/or electrical components, and wherein the keeper movement detection unit comprises at least one position sensor and/or movement sensor configured to detect movement of the keeper.

13. The cargo hook of claim 8 wherein the keeper movement lock unit is configured to lock movement of the keeper about the keeper pivot connection after an initial movement of the keeper, and wherein the initial movement of the keeper comprises an initial keeper opening movement and/or an initial keeper closing movement, and wherein the locking prevents release of the load from the load arm until reset of the keeper movement lock unit.

14. The cargo hook of claim 8 wherein the keeper movement lock unit is configured to have the keeper locked configuration that locks movement of the keeper;

wherein the keeper movement lock unit is configured to have the keeper unlocked configuration that unlocks movement of the keeper; and wherein the keeper unlocked configuration is established after reset of the keeper control unit and/or the keeper movement lock unit in response to detected movement of the load arm.

15. The cargo hook of claim 8 wherein the load arm movement detection unit is configured to detect and/or indicate movement of the load arm, including detection of the load arm opening movement and the load arm closing movement.

16. A cargo hook comprising:

a main body;

a load arm configured to be pivotally attached to the main body with a load arm pivot connection;

a keeper configured to be pivotally attached to the main body through a keeper pivot connection; and a keeper control unit configured to have a keeper locked configuration that locks movement of the keeper about the keeper pivot connection with respect to the main body, wherein the keeper control unit comprises: a keeper movement detection unit;

a keeper movement lock unit; and a load arm movement detection unit; and wherein the keeper movement lock unit is configured to have the keeper locked configuration that locks movement of the keeper after the keeper movement detection unit detects a keeper opening movement and/or a keeper closing movement.

17. A cargo hook comprising:

a main body;

a load arm configured to be pivotally attached to the main body with a load arm pivot connection;

a keeper configured to be pivotally attached to the main body through a keeper pivot connection; and a keeper control unit configured to have a keeper locked configuration that locks movement of the keeper about the keeper pivot connection with respect to the main body, wherein the keeper control unit comprises: a keeper movement detection unit;

a keeper movement lock unit; and a load arm movement detection unit; and further comprising:

a selector unit comprising a first configuration disabling operation of the keeper movement lock unit to place the keeper in a keeper unlocked configuration; and the selector unit comprising a second configuration enabling operation of the keeper movement lock unit and/or the keeper control unit to operate the keeper in a keeper locked configuration.

18. A cargo hook comprising:

a main body;

a load arm configured to be pivotally attached to the main body with a load arm pivot connection;

a keeper configured to be pivotally attached to the main body through a keeper pivot connection; and a keeper control unit configured to have a keeper locked configuration that locks movement of the keeper about the keeper pivot connection with respect to the main body, wherein the keeper control unit comprises: a keeper movement detection unit;

a keeper movement lock unit; and a load arm movement detection unit; and wherein the keeper control unit and/or the keeper movement lock unit being configured to receive an indication from the load arm movement detection unit that has detected a load arm opening movement and/or a load arm closing movement; and wherein the keeper control unit and/or the keeper movement lock unit thereafter being reset and the keeper being placed in a keeper unlocked configuration.

19. A process of implementing a cargo hook comprising:

providing a main body;

providing a load arm configured to be pivotally attached to the main body with a load arm pivot connection;

providing a keeper configured to be pivotally attached to the main body through a keeper pivot connection; and providing a keeper control unit configured to have a keeper locked configuration that locks movement of the keeper about the keeper pivot connection with respect to the main body, wherein the process further comprises:

providing a keeper movement detection unit configured to detect and/or indicate movement of the keeper;

providing a keeper movement lock unit configured to lock movement of the keeper about the keeper pivot connection after an initial movement of the keeper;

providing a load arm movement detection unit configured to detect and/or indicate movement of the load arm;

operating the keeper movement lock unit, after the keeper movement detection unit detects movement of the keeper, to lock the keeper; and receiving, by the keeper control unit and/or the keeper movement lock unit, an indication from the load arm movement detection unit that has detected a load arm opening movement and/or a load arm closing movement, and thereafter resetting the keeper control unit and/or the keeper movement lock unit and placing the keeper in a keeper unlocked configuration.

20. The process of implementing a cargo hook of claim 19 further comprising:

providing a hook disengage unit configured to have a locked configuration that locks movement of the load arm about the load arm pivot connection with respect to the main body; and configuring the hook disengage unit to have an unlocked configuration that allows movement of the load arm about the load arm pivot connection with respect to the main body, wherein configuring the hook disengage unit to have the unlocked configuration allows the load arm to rotate about the load arm pivot connection to release cargo, disengage cargo, and/or jettison cargo, and wherein movement of the load arm is detected by the load arm movement detection unit to reset the keeper control unit and/or the keeper movement lock unit and place the keeper in a keeper unlocked configuration.

* * * * *